US 7,697,777 B2

(12) United States Patent
Ludwig

(10) Patent No.: US 7,697,777 B2
(45) Date of Patent: *Apr. 13, 2010

(54) COMPUTING ARBITRARY FRACTIONAL POWERS OF A TRANSFORM OPERATOR FROM SELECTED PRECOMPUTED FRACTIONAL POWERS OF THE OPERATOR

(76) Inventor: Lester F. Ludwig, P.O. Box 128, Belmont, CA (US) 94002

( * ) Notice: Subject to any disclaimer, the term of this patent is extended or adjusted under 35 U.S.C. 154(b) by 55 days.

This patent is subject to a terminal disclaimer.

(21) Appl. No.: 11/929,360

(22) Filed: Oct. 30, 2007

(65) Prior Publication Data

US 2009/0052794 A1    Feb. 26, 2009

Related U.S. Application Data

(63) Continuation of application No. 11/697,624, filed on Apr. 6, 2007, which is a continuation of application No. 10/937,192, filed on Sep. 9, 2004, now Pat. No. 7,203,377, which is a continuation of application No. 10/665,439, filed on Sep. 18, 2003, now Pat. No. 7,054,504, which is a continuation-in-part of application No. 09/512,775, filed on Feb. 25, 2000, now Pat. No. 6,687,418.

(60) Provisional application No. 60/121,680, filed on Feb. 25, 1999, provisional application No. 60/121,958, filed on Feb. 25, 1999.

(51) Int. Cl.
*G06K 9/40* (2006.01)
*G06K 9/36* (2006.01)

(52) U.S. Cl. .................... 382/255; 382/280
(58) Field of Classification Search ......... 382/254–255, 382/274–275, 280, 312, 305; 359/29, 31, 359/279, 560; 709/232
See application file for complete search history.

(56) References Cited

U.S. PATENT DOCUMENTS 6,304,317 B1 * 10/2001 Taniguchi et al. .......... 355/55
6,341,179 B1 * 1/2002 Stoyle et al. ............... 382/254

* cited by examiner

*Primary Examiner*—Kanji Patel
(74) *Attorney, Agent, or Firm*—Craig W. Schmoyer

(57) ABSTRACT

A computer-implemented system and method for correcting misfocus in original particle beam image data by using a fractional Fourier transform operation or an approximation of it. In one embodiment, the particle beam image data is produced by an electron microscope. The approximation of a fractional Fourier transform operation may comprise a portion of a Taylor series expansion, a Hermite function expansion, a perturbation approximation, a singular integral approximation, or an infinitesimal generator. The described embodiments provide for the reconstruction of phase information associated with the original image data, and for the reconstructed phase information to also utilize an approximation of a fractional Fourier transform operation. The focus correction can be selected and controlled by user interaction or an automatic feedback control system that may include optimization.

15 Claims, 9 Drawing Sheets

901

$$F^\alpha = (\,|F^\alpha|\;\angle F^\alpha\,)$$

FrFT Amplitude Phase
Operator component component

902

Optics → Math Correction → Corrected Result $$F^{2-\varepsilon} \cdot F^{\varepsilon} = F^2$$

903

Optics → Math Correction → Corrected Result $$(\,|F^{2-\varepsilon}|\;\angle F^{2-\varepsilon}\,) \cdot (\,|F^{\varepsilon}|\;\angle F^{\varepsilon}\,) = F^2$$

904

Amplitude Only Image → Math Correction → Corrected Result $$(\,|F^{2-\varepsilon}|\;\underbrace{\phantom{XXXX}}_{\text{Missing phase information}}\,) \cdot (\,|F^{\varepsilon}|\;\angle F^{\varepsilon}\,) \ne F^2$$

905

Amplitude Only Image → Phase-Restored Math Correction → Corrected Result $$(\,|F^{2-\varepsilon}|\,) \cdot (\,\angle F^{2-\varepsilon}\,|F^{\varepsilon}|\,\angle F^{\varepsilon}\,) = F^2$$

$$(\,\angle F^{2-\varepsilon}\quad F^{\varepsilon}\,)$$

FIG. 9

COMPUTING ARBITRARY FRACTIONAL POWERS OF A TRANSFORM OPERATOR FROM SELECTED PRECOMPUTED FRACTIONAL POWERS OF THE OPERATOR

CROSS REFERENCE TO RELATED APPLICATIONS

This application is a continuation of U.S. application Ser. No. 11/697,624, filed Apr. 6, 2007, currently pending, which is a continuation of U.S. application Ser. No. 10/937,192 filed Sep. 9, 2004, now U.S. Pat. No. 7,203,377, which is a continuation of U.S. application Ser. No. 10/665,439 filed Sep. 18, 2003, now U.S. Pat. No. 7,054,504, which is a continuation-in-part of U.S. application Ser. No. 09/512,775 entitled "CORRECTION OF UNFOCUSED LENS EFFECTS VIA FRACTIONAL FOURIER TRANSFORM" filed Feb. 25, 2000, now U.S. Pat. No. 6,687,418 which claims benefit of priority of U.S. provisional applications Ser. Nos. 60/121,680 and 60/121,958, each filed on Feb. 25, 1999.

BACKGROUND OF THE INVENTION

1. Field of the Invention

This invention relates to optical signal processing, and more particularly to the use of fractional Fourier transform properties of lenses to correct the effects of lens misfocus in photographs, video, and other types of captured images.

2. Discussion of the Related Art

A number of references are cited herein; these are provided in a numbered list at the end of the detailed description of the preferred embodiments. These references are cited at various locations throughout the specification using a reference number enclosed in square brackets.

The Fourier transforming properties of simple lenses and related optical elements is well known and heavily used in a branch of engineering known as Fourier optics [1,2]. Classical Fourier optics [1,2,3,4] utilize lenses or other means to obtain a two-dimensional Fourier transform of an optical wavefront, thus creating a Fourier plane at a particular spatial location relative to an associated lens. This Fourier plane includes an amplitude distribution of an original two-dimensional optical image, which becomes the two-dimensional Fourier transform of itself. In the far simpler area of classical geometric optics [1,3], lenses and related objects are used to change the magnification of a two-dimensional image according to the geometric relationship of the classical lens-law. It has been shown that between the geometries required for classical Fourier optics and classical geometric optics, the action of a lens or related object acts on the amplitude distribution of images as the fractional power of the two-dimensional Fourier transform. The fractional power of the fractional Fourier transform is determined by the focal length characteristics of the lens, and the relative spatial separation between a lens, source image, and an observed image.

The fractional Fourier transform has been independently discovered on various occasions over the years [5,7,8,9,10], and is related to several types of mathematical objects such as the Bargmann transform [8] and the Hermite semigroup [13]. As shown in [5], the most general form of optical properties of lenses and other related elements [1,2,3] can be transformed into a fractional Fourier transform representation. This property has apparently been rediscovered some years later and worked on steadily ever since (see for example [6]), expanding the number of optical elements and situations covered. It is important to remark, however, that the lens modeling approach in the latter ongoing series of papers view the multiplicative phase term in the true form of the fractional Fourier transform as a problem or annoyance and usually omit it from consideration.

SUMMARY OF THE INVENTION

Correction of the effects of misfocusing in recorded or real-time image data may be accomplished using fractional Fourier transform operations realized optically, computationally, or electronically. In some embodiments, the invention extends the capabilities of using a power of the fractional Fourier transform for correcting misfocused images, to situations where phase information associated with the original image misfocus is unavailable. For example, conventional photographic and electronic image capture, storage, and production technologies can only capture and process image amplitude information—the relative phase information created within the original optical path is lost. As will be described herein, the missing phase information can be reconstructed and used when correcting image misfocus.

In accordance with some embodiments, algebraic group properties of the fractional Fourier transform are used to back-calculate lost original relative phase conditions that would have existed if a given specific corrective operation were to correct a misfocused image. Corrective iterations can then be made to converge on a corrected focus condition. Simplified numerical calculations of phase reconstructions may be obtained by leveraging additional properties of the fractional Fourier transform for employing pre-computed phase reconstructions.

Some embodiments use the inherent fractional Fourier transform properties of lenses or related elements or environments, such as compound lenses or graded-index materials, to correct unfocused effects of various types of captured images. Use of the algebraic unitary group property of the fractional Fourier transform allows for a simple characterization of the exact inverse operation for the initial misfocus.

One aspect of the present invention reconstructs relative phase information affiliated with the original misfocused optical path in the correction of misfocused images.

Another aspect of the present invention provides for the calculation of an associated reconstruction of relative phase information, which would be accurate if an associated trial fractional Fourier transform power were the one to correct the focus of the original misfocused image.

Another aspect of the present invention provides for simplified calculation of the phase reconstruction information using algebraic group and antisymmetry properties of the fractional Fourier transform operator.

Still yet another aspect of the present invention provides for simplified calculation of the phase reconstruction information using modified calculations of fractional powers of the Fourier transform.

Another aspect of the present invention provides for simplified calculation of the phase reconstruction information by rearranging terms in the calculation of a fractional Fourier transform operator.

Yet another aspect of the present invention provides for simplified calculation of the phase reconstruction information using a partition of terms in the calculation of a fractional Fourier transform operator.

Still yet another aspect of the present invention provides for relevant fractional Fourier transform operations to be accomplished directly or approximately by means of optical components, numerical computer, digital signal processing, or other signal processing methods or environments.

Yet another aspect of the present invention provides approximation methods which leverage Hermite function expansions which can be advantageous in that the orthogonal Hermite functions diagonalize the Fourier transform and fractional Fourier transform, yielding the following two-fold result. First, throughout the entire optical system, the amplitude and phase affairs of each Hermite function are completely independent of those of the other Hermite functions. Second, the Hermite function expansion of a desired transfer function will naturally have coefficients that eventually go to zero, meaning that to obtain an arbitrary degree of approximation in some situations, only a manageable number of Hermite functions need be considered.

Another aspect of the present invention allows the power of the fractional Fourier transform to be determined by automatic methods. These automatic methods may include edge detection elements and provisions for partial or complete overriding by a human operator.

Still yet another aspect of the present invention provides for the fraction Fourier transform power to be determined entirely by a human operator.

Another aspect of the invention provides for pre-computed values of phase reconstructions corresponding to pre-computed powers of fractional Fourier transform to be composed to create phase reconstructions corresponding to other powers of the fractional Fourier transform.

Another aspect of the present invention provides for at least one pre-computed power of the fractional Fourier transform to be used in computing or approximating higher powers of the fractional Fourier transform.

Yet another aspect of the present invention provides for pre-computed values of phase reconstructions corresponding to powers of fractional Fourier transform, wherein the powers are related by roots of the number 2 or in other ways to leverage fractional expansion.

Still yet another aspect of the present invention provides for composed phase reconstructions that are realized in correspondence to binary representations of fractions.

Yet another aspect of the present invention provides for combining numerical correction of video camera lens misfocus with video decompression algorithms to increase performance and reduce required misfocus-correction computations.

The present invention enables the recovery of misfocused images obtained from photographs, video, movies, and other types of captured images. Because a high quality lens or lens system operates on the amplitude distribution of the source image as a two-dimensional fractional Fourier transform, the algebraic unitary group property of the fractional Fourier transform allows for the exact calculation of the inverse operation for initial lens misfocus. Additional mathematical properties of the fractional Fourier transform allow for different methods of approximation meaningful in the economic embodiments of the invention. The system and method provided herein enable economic and wide-ranging implementation for after-capture correction of image misfocus, for example.

BRIEF DESCRIPTION OF THE DRAWINGS

The above and other aspects, features and advantages of the present invention will become more apparent upon consideration of the following description of preferred embodiments taken in conjunction with the accompanying drawing figures, wherein:

FIG. 9 shows techniques for computing phase correction determined by the fractional Fourier transform applied to a misfocused image.

DETAILED DESCRIPTION OF THE PREFERRED EMBODIMENTS

In the following description, reference is made to the accompanying drawing figures which form a part hereof, and which show by way of illustration specific embodiments of the invention. It is to be understood by those of ordinary skill in this technological field that other embodiments may be utilized, and structural, electrical, optical, as well as procedural changes may be made without departing from the scope of the present invention.

As used herein, the term "image" refers to both still-images (such as photographs, video frames, video stills, movie frames, and the like) and moving images (such as motion video and movies). Many embodiments of the present invention are directed to processing recorded or real-time image data provided by an exogenous system, means, or method. Presented image data may be obtained from a suitable electronic display such as an LCD panel, CRT, LED array, films, slides, illuminated photographs, and the like. Alternatively or additionally, the presented image data may be the output of some exogenous system such as an optical computer or integrated optics device, to name a few. The presented image data will also be referred to herein as the image source.

If desired, the system may output generated image data having some amount of misfocus correction. Generated image data may be presented to a person, sensor (such as a CCD image sensor, photo-transistor array, for example), or some exogenous system such as an optical computer, integrated optics device, and the like. The entity receiving generated image data will be referred to as an observer, image observation entity, or observation entity.

Figure 2:
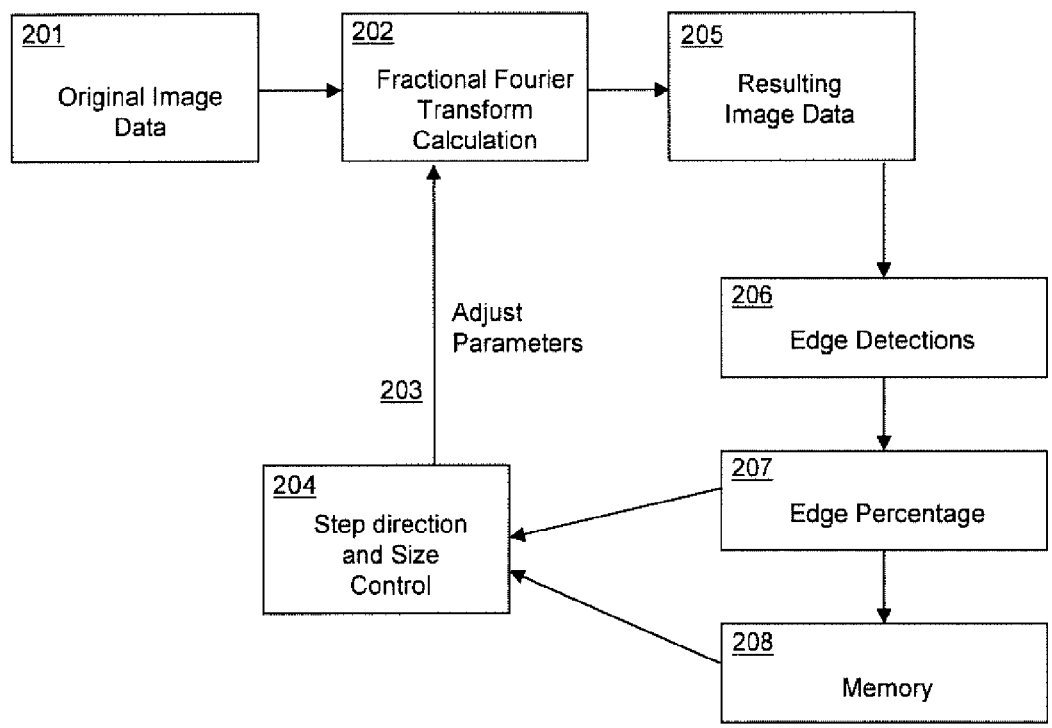
FIG. 2 is a block diagram showing an exemplary approach for automated adjustment of fractional Fourier transform parameters for maximizing the sharp edge content of a corrected image, in accordance with one embodiment of the present invention.
Figure 3:
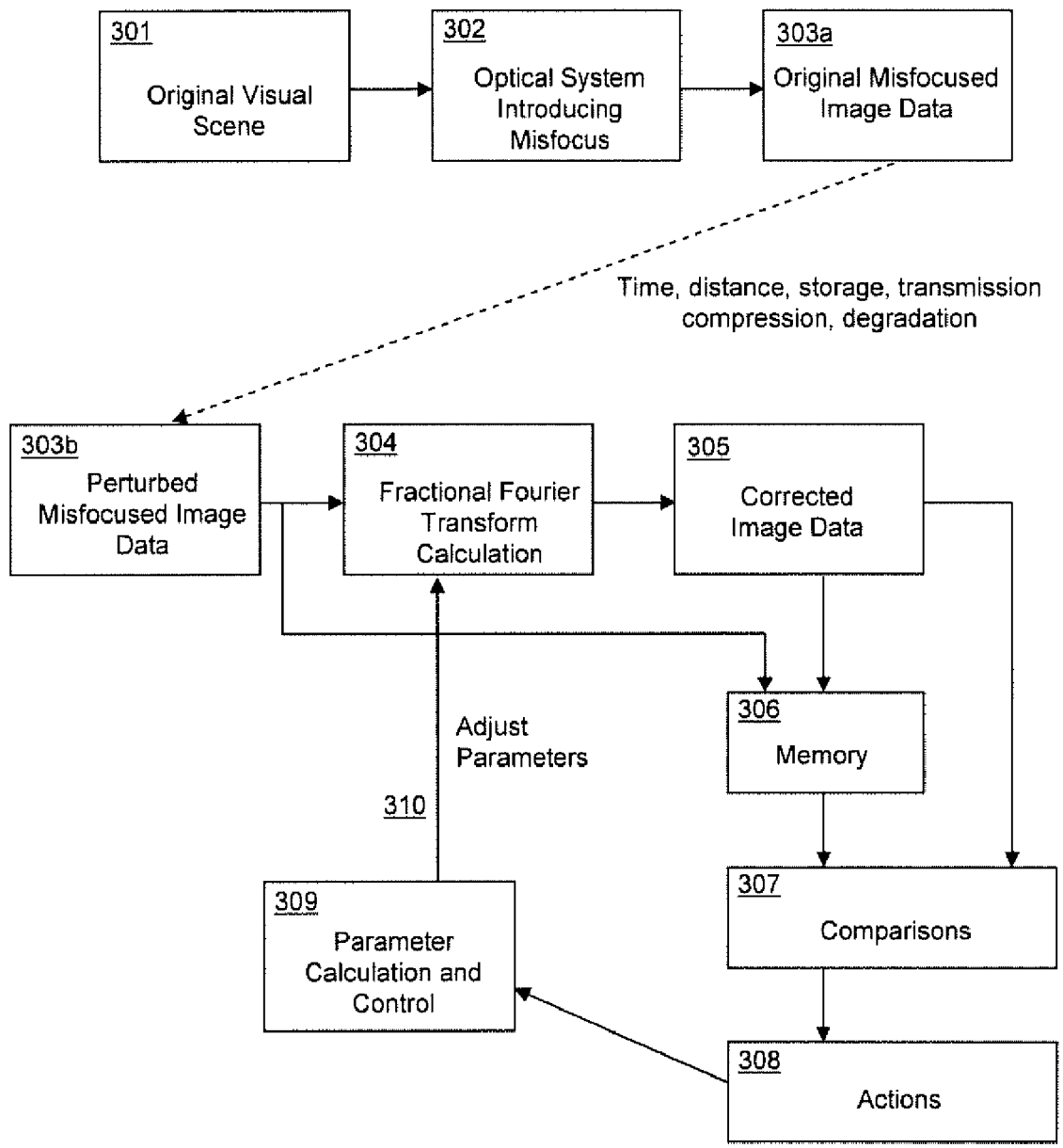
FIG. 3 is a block diagram showing a typical approach for adjusting the fractional Fourier transform parameters to maximize misfocus correction of an image, in accordance with one embodiment of the present invention.

Reference will first be made to FIG. 3 which shows a general approach for adjusting the fractional Fourier transform parameters to maximize the correction of misfocus in an image. Details regarding the use of a fractional Fourier transform (with adjusted parameters of exponential power and scale) to correct image misfocus will be later described with regard to FIGS. 1 and 2.

Original visual scene 301 (or other image source) may be observed by optical system 302 (such as a camera and lens arrangement) to produce original image data 303a. In accordance with some embodiments, optical system 302 may be limited, misadjusted, or otherwise defective to the extent that it introduces a degree of misfocus into the image represented by the image data 303a. It is typically not possible or practical to correct this misfocus effect at optical system 302 to produce a better focused version of original image data 303a. Misfocused original image data 303a may be stored over time or transported over distance. During such a process, the original image data may be transmitted, converted, compressed, decompressed, or otherwise degraded, resulting in an identical or perturbed version of original image data 303b. It is this perturbed version of the original image data that may be improved using the misfocus correction techniques disclosed herein. Original and perturbed image data 303a, 303b may be in the form of an electronic signal, data file, photography paper, or other image form.

Original image data 303b may be manipulated numerically, optically, or by other means to perform a fractional Fourier transform operation 304 on the original image data to produce resulting (modified) image data 305. The parameters of exponential power and scale factors of the fractional Fourier transform operation 304 may be adjusted 310 over some range of values, and each parameter setting within this range may result in a different version of resulting image data 305. As the level of misfocus correction progresses, the resulting image data 305 will appear more in focus. The improvement in focus will generally be obvious to an attentive human visual observer, and will typically be signified by an increase in image sharp-ness, particularly at any edges that appear in the image. Thus a human operator, a machine control system, or a combination of each can compare a sequence of resulting images created by previously selected parameter settings 310, and try a new parameter setting for a yet another potential improvement.

For a human operator, this typically would be a matter of adjusting a control and comparing images side by side (facilitated by non-human memory) or, as in the case of a microscope or telescope, by comparison facilitated purely with human memory. For a machine, a systematic iterative or other feedback control scheme would typically be used. In FIG. 3, each of these image adjustments is generalized by the steps and elements suggested by interconnected elements 306-309, although other systems or methods accomplishing the same goal with different internal structure (for example, an analog electronic circuit, optical materials, or chemical process) are provided for and anticipated by the present invention. For the illustrative general case of FIG. 3, resulting image data 305 for selected parameter settings 310 may be stored in human, machine, or photographic memory 306, along with the associated parameter settings, and compared 307 for the quality of image focus. Based on these comparisons, subsequent high level actions 308 may be chosen.

High level actions 308 typically may require translation into new parameter values and their realization, which may be provided by parameter calculation and control 309. This process may continue for some interval of time, some number of resulting images 305, or some chosen or pre-determined maximum level of improvement. One or more "best choice" resulting image data set or sets 305 may then be identified as the result of the action and processes depicted in this figure.

With this high level description having been established, attention is now directed to details of the properties and use of a fractional Fourier transform (with adjusted parameters of exponential power and scale) to correct misfocus in an image and maximize correction of misfocus. This aspect of the present invention will be described with regard to FIG. 1.

Figure 1:
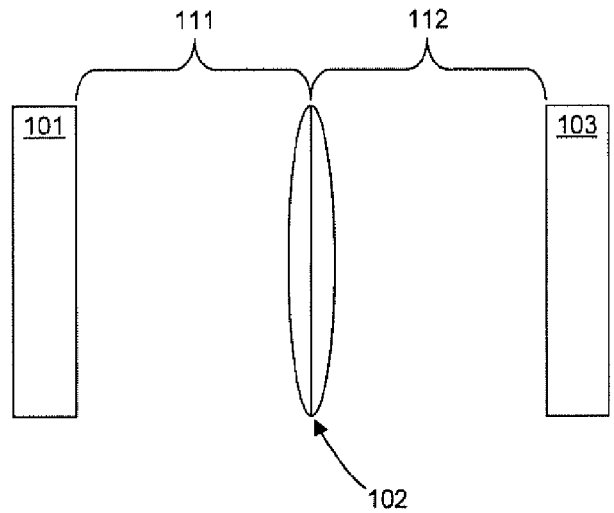
FIG. 1 is a block diagram showing a general lens arrangement and associated image observation entity capable of classical geometric optics, classical Fourier optics, and fractional Fourier transform optics.

FIG. 1 is a block diagram showing image source 101, lens 102, and image observation entity 103. The term "lens" is used herein for convenience, but it is to be understood that the image misfocus correction techniques disclosed herein apply equally to lens systems and other similar optical environments. The image observation entity may be configured with classical geometric optics, classical Fourier optics, or fractional Fourier transform optics. The particular class of optics (geometric, Fourier, or fractional Fourier) implemented in a certain application may be determined using any of the following:

separation distances 111 and 112;

the "focal length" parameter "f" of lens 102;

the type of image source (lit object, projection screen, etc.) in as far as whether a plane or spherical wave is emitted.

As is well known, in situations where the source image is a lit object and where distance 111, which shall be called "a," and distance 112, which shall be called "b," fall $$\frac{1}{f} = \frac{1}{a} + \frac{1}{b} \tag{1}$$

into the lens-law relationship, may be determined by the focal length f:

which gives the geometric optics case. In this case, observed image 103 is a vertically and horizontally inverted version of the original image from source 101, scaled in size by a magnification factor m given by:

$$m = \frac{b}{a} \tag{2}$$

As previously noted, the Fourier transforming properties of simple lenses and related optical elements is also well known in the field of Fourier optics [2,3]. Classical Fourier optics [2,3,4,5] involve the use of a lens, for example, to take a first two-dimensional Fourier transform of an optical wavefront, thus creating a Fourier plane at a particular spatial location such that the amplitude distribution of an original two-dimensional optical image becomes the two-dimensional Fourier transform of itself. In the arrangement depicted in FIG. 1, with a lit object serving as source image 101, the Fourier optics case may be obtained when a=b=f.

As described in [5], for cases where a, b, and f do not satisfy the lens law of the Fourier optics condition above, the amplitude distribution of source image 101, as observed at observation entity 103, experiences the action of a non-integer power of the Fourier transform operator. As described in [5], this power, which shall be called a, varies between 0 and 2 and is determined by an Arc-Cosine function dependent on the lens focal length and the distances between the lens, image source, and image observer; specifically:

$$\alpha = \frac{2}{\pi}\arccos\left[\operatorname{sgn}(f-a)\frac{\sqrt{(f-a)(f-b)}}{f}\right] \quad (3)$$

for cases where (f−a) and (f−b) share the same sign. There are other cases which can be solved from the more primitive equations in [5] (at the bottom of pages ThE4-3 and ThE4-1). Note simple substitutions show that the lens law relationship among a, b, and f indeed give a power of 2, and that the Fourier optics condition of a=b=f give the power of 1, as required.

The fractional Fourier transform properties of lenses typically cause complex but predictable phase and scale variations. These variations may be expressed in terms of Hermite functions, as presented shortly, but it is understood that other representations of the effects, such as closed-form integral representations given in [5], are also possible and useful.

Several methods can be used to construct the fractional Fourier transform, but to begin it is illustrative to use the orthogonal Hermite functions, which as eigenfunctions diagonalize the Fourier transform [17]. Consider the Hermite function [16] expansion [17, and more recently, 18] of the two dimensional image amplitude distribution function. In one dimension, a bounded (i.e., non-infinite) function k(x) can be represented as an infinite sum of Hermite functions $\{h_n(x)\}$ as:

$$k(x) = \sum_{n=0}^{\infty} a_n h_n(x) \quad (4)$$

Since the function is bounded, the coefficients $\{a_n\}$ eventually become smaller and converge to zero. An image may be treated as a two dimensional entity (for example, a two-dimensional array of pixels), or it can be the amplitude variation of a translucent plate; in either case, the function may be represented in a two-dimensional expansion such as:

$$k(x_1, x_2) = \sum_{m=0}^{\infty}\sum_{n=0}^{\infty} a_{n,m} h_n(x_1) h_m(x_2) \quad (5)$$

For simplicity, the one dimensional case may be considered. The Fourier transform action on Hermite expansion of the function k(x) with series coefficients $\{a_n\}$ is given by [16]:

$$F[k(x)] = \sum_{n=0}^{\infty} (-i)^n a_n h_n(x) \quad (6)$$

Because of the diagonal eigenfunction structure, fractional powers of the Fourier transform operator may be obtained by taking the fractional power of each eigenfunction coefficient. The eigenfunction coefficients here are $(-i)^n$. Complex branching artifact ambiguities that arise from taking the roots of complex numbers can be avoided by writing (−i) as:

$$e^{-i\pi/2} \quad (7)$$

Thus for a given power α, the fractional Fourier transform of the Hermite expansion of the function k(x) with series coefficients $\{a_n\}$ can be given by [5]:

$$F^\alpha[k(x)] = \sum_{n=0}^{\infty} e^{-in\pi\alpha/2} a_n h_n(x) \quad (8)$$

Note when α=1, the result is the traditional Fourier transform above, and when α=2, the result may be expressed as:

$$F^2[k(x)] = \quad (9)$$
$$\sum_{n=0}^{\infty} e^{-in\pi} a_n h_n(x) = \sum_{n=0}^{\infty} (-1)^n a_n h_n(x) = \sum_{n=0}^{\infty} a_n h_n(-x) = k(-x)$$

due to the odd and even symmetry, respectively, of the odd and even Hermite functions. This is the case for the horizontally and vertically inverted image associated with the lens law of geometric optics, although here the scale factors determining the magnification factor have been normalized out.

More generally, as the power α varies (via the Arccosine relationship depending on the separation distance), the phase angle of the $n^{th}$ coefficient of the Hermite expansion varies according to the relationship shown above and the scale factor may vary as well [5]. For images, all of the above occurs in the same manner but in two dimensions [5].

Through use of the Mehler kernel [16], the above expansion may be represented in closed form as [5]:

$$F^\alpha[k(x)] = \quad (10)$$
$$\sqrt{\frac{e^{-\pi\alpha i/2}}{i\sin(\pi\alpha/2)}}\int_{-\infty}^{\infty} k(x)e^{2\pi i\left[\left(\frac{x^2+y^2}{2}\right)\cot\left(\frac{\pi\alpha}{2}\right) - xy\csc\left(\frac{\pi\alpha}{2}\right)\right]}dx$$

Note in [5] that the factor of i multiplying the sin function under the radical has been erroneously omitted. Clearly, both the Hermite and integral representations are periodic in α with period four. Further, it can be seen from either representation that:

$$F^{2\pm\epsilon}[k(x)] = F^2 F^{\pm\epsilon}[k(x)] = F^{\pm\epsilon}F^2[k(x)] = F^{\pm\epsilon}[k(-x)] \quad (11)$$

which illustrates an aspect of the invention as the effect ε will be the degree of misfocus introduced by the misfocused lens, while the Fourier transform raised to the second power represents the lens-law optics case. In particular, the group property makes it possible to calculate the inverse operation to the effect induced on a record image by a misfocused lens in terms of explicit mathematical operations that can be realized either computationally, by means of an optical system, or both. Specifically, because the group has period 4, it follows that $F^{-2}=F^2$; thus:

$$(F^{2\pm\epsilon}[k(x)])^{-1} = F^{-2}F^{\mp\epsilon}[k(x)] = F^2 F^{\mp\epsilon}[k(x)] = F^{\mp\epsilon}F^2[k(x)] = F^{\mp\epsilon}[k(-x)] \quad (12)$$

Thus, one aspect of the invention provides image misfocus correction, where the misfocused image had been created by a quality though misfocused lens or lens-system. This misfocus can be corrected by applying a fractional Fourier transform operation; and more specifically, if the lens is misfocused by an amount corresponding to the fractional Fourier transform of power ε, the misfocus may be corrected by applying a fractional Fourier transform operation of power −ε.

It is understood that in some types of situations, spatial scale factors of the image may need to be adjusted in conjunction with the fractional Fourier transform power. For small variations of the fractional Fourier transform power associated with a slight misfocus, this is unlikely to be necessary. However, should spatial scaling need to be made, various optical and signal processing methods well known to those skilled in the art can be incorporated. In the case of pixilated images (images generated by digital cameras, for example) or lined-images (generated by video-based systems, for example), numerical signal processing operations may require standard resampling (interpolation and/or decimation) as is well known to those familiar with standard signal processing techniques.

It is likely that the value of power $\epsilon$ is unknown a priori. In this particular circumstance, the power of the correcting fractional Fourier transform operation may be varied until the resulting image is optimally sharpened. This variation could be done by human interaction, as with conventional human interaction of lens focus adjustments on a camera or microscope, for example.

If desired, this variation could be automated using, for example, some sort of detector in an overall negative feedback situation. In particular, it is noted that a function with sharp edges are obtained only when its contributing, smoothly-shaped basis functions have very particular phase adjustments, and perturbations of these phase relationships rapidly smooth and disperse the sharpness of the edges. Most natural images contain some non-zero content of sharp edges, and further it would be quite unlikely that a naturally occurring, smooth gradient would tighten into a sharp edge under the action of the fractional Fourier transform because of the extraordinary basis phase relationships required. This suggests that a spatial high-pass filter, differentiator, or other edge detector could be used as part of the sensor makeup. In particular, an automatically adjusting system may be configured to adjust the fractional Fourier transform power to maximize the sharp edge content of the resulting correcting image. If desired, such a system may also be configured with human override capabilities to facilitate pathological image situations, for example.

FIG. 2 shows an automated approach for adjusting the fractional Fourier transform parameters of exponential power and scale factor to maximize the sharp edge content of the resulting correcting image. In this figure, original image data 201 is presented to an adjustable fractional Fourier transform element 202, which may be realized physically via optical processes or numerically (using an image processing or computation system, for example). The power and scale factors of the fractional Fourier transform may be set and adjusted 203 as necessary under the control of a step direction and size control element 204.

Typically, this element would initially set the power to the ideal value of zero (making the resulting image data 205 equivalent to the original image data 201) or two (making the resulting image data 205 equivalent to an inverted image of original image data 201), and then deviate slightly in either direction from this initial value. The resulting image data 205 may be presented to edge detector 206 which identifies edges, via differentiation or other means, whose sharpness passes a specified fixed or adaptive threshold. The identified edge information may be passed to an edge percentage tally element 207, which transforms this information into a scalar-valued measure of the relative degree of the amount of edges, using this as a measure of image sharpness.

The scalar measure value for each fractional Fourier transform power may be stored in memory 208, and presented to step direction and size control element 204. The step direction and size control element compares this value with the information stored in memory 208 and adjusts the choice of the next value of fractional Fourier transform power accordingly. In some implementations, the step direction and size control element may also control edge detection parameters, such as the sharpness threshold of edge detector element 207. When the optimal adjustment is determined, image data 205 associated with the optimal fractional Fourier transform power is designated as the corrected image.

It is understood that the above system amounts to a negative-feedback control or adaptive control system with a fixed or adaptive observer. As such, it is understood that alternate means of realizing this automated adjustment can be applied by those skilled in the art. It is also clear to one skilled in the art that various means of interactive human intervention may be introduced into this automatic system to handle problem cases or as a full replacement for the automated system.

In general, the corrective fractional Fourier transform operation can be accomplished by any one or combination of optical, numerical computer, or digital signal processing methods as known to those familiar with the art, recognizing yet other methods may also be possible. Optical methods may give effectively exact implementations of the fractional Fourier transforms, or in some instances, approximate implementations of the transforms. For a pixilated image, numerical or other signal processing methods may give exact implementations through use of the discrete version of the fractional Fourier transform [10].

Additional computation methods that are possible include one or more of:
  dropping the leading scalar complex-valued phase term (which typically has little or no effect on the image);
  decomposing the fractional Fourier transform as a pre-multiplication by a "phase chirp" $e^{icz^2}$, taking a conventional Fourier transform with appropriately scaled variables, and multiplying the result by another "phase chirp;" and
  changing coordinate systems to Wigner form:

$$\left\{ \frac{(x+y)}{w}, \frac{(x-y)}{w} \right\} \tag{13}$$

If desired, any of these just-described computation methods can be used with the approximating methods described below.

Other embodiments provide approximation methods for realizing the corrective fractional Fourier transform operation. For a non-pixilated image, numerical or other signal processing methods can give approximations through:
  finite-order discrete approximations of the integral representation;
  finite-term discrete approximations by means of the Hermite expansion representation; and
  the discrete version of the fractional Fourier transform [10].

Classical approximation methods [11,12] may be used in the latter two cases to accommodate particular engineering, quality, or cost considerations.

In the case of Hermite expansions, the number of included terms may be determined by analyzing the Hermite expansion of the image data, should this be tractable. In general, there will be some value in situations where the Hermite function expansion of the image looses amplitude as the order of the Hermite functions increases. Hermite function orders with zero or near-zero amplitudes may be neglected entirely from the fractional Fourier computation due to the eigenfunction role of the Hermite functions in the fractional Fourier transform operator.

One method for realizing finite-order discrete approximations of the integral representation would be to employ a localized perturbation or Taylor series expansion of the integral representation. In principal, this approach typically requires some mathematical care in order for the operator to act as a reflection operator (i.e., inversion of each horizontal direction and vertical direction as with the lens law) since the kernel behaves as a generalized function (delta function), and hence the integral representation of the fractional Fourier transform operator resembles a singular integral.

In a compound lens or other composite optical system, the reflection operator may be replaced with the identity operator, which also involves virtually identical delta functions and singular integrals as is known to those familiar in the art. However, this situation is fairly easy to handle as a first or second-order Taylor series expansion. The required first, second, and any higher-order derivatives of the fractional Fourier transform integral operator are readily and accurately obtained symbolically using available mathematical software programs, such as Mathematica or MathLab, with symbolic differential calculus capabilities. In most cases, the zero-order term in the expansion will be the simple reflection or identity operator. The resulting expansion may then be numerically approximated using conventional methods.

Another method for realizing finite-order discrete approximations of the integral representation would be to employ the infinitesimal generator of the fractional Fourier transform, that is, the derivative of the fractional Fourier transform with respect to the power of the transform. This is readily computed by differentiating the Hermite function expansion of the fractional Fourier transform, and use of the derivative rule for Hermite functions. Depending on the representation used [5,14,15], the infinitesimal generator may be formed as a linear combination of the Hamiltonian operator H and the identity operator I; for the form of the integral representation used earlier, this would be:

$$\frac{i\pi}{4}(H+I) \tag{14}$$

where and the identity operator I simply reproduces the original function, and $$H = \frac{\partial^2}{\partial x^2} - x^2 \tag{15}$$

The role of the infinitesimal generator, which can be denoted as A, is to represent an operator group in exponential form, a particular example is:

$$F^\alpha = e^{\alpha A} \tag{16}$$

For small values of A, one can then approximate $e^{\alpha A}$ as $I+(\alpha A)$, so using the fact [12] from before (repeated here):

$$(F^{2\pm\epsilon}[k(x)])^{-1} = F^{-2}F^{\mp\epsilon}[k(x)] = F^2 F^{\mp\epsilon}[k(x)] = F^{\mp\epsilon}F^2$$
$$[k(x)] = F^{\mp\epsilon}[k(-x)] \tag{12}$$

one can then approximate $F^\epsilon$ as $$F^\epsilon = 1 + (\epsilon A) = 1 + \epsilon \frac{i\pi}{4}\left(\frac{\partial^2}{\partial x^2} - x^2 + I\right) \tag{18}$$

These operations can be readily applied to images using conventional image processing methods.

For non-pixilated images, the original source image can be approximated by two-dimensional sampling, and the resulting pixilated image can then be subjected to the discrete version of the fractional Fourier transform [10].

In cases where the discrete version of the fractional Fourier transform [10] is implemented, the transform may be approximated. The discrete representation can, for example, be a three-dimensional matrix (tensor) operator. Alternatively, pairs of standard two-dimensional matrices, one for each dimension of the image, can be used. As with the continuous case, various types of analogous series approximations, such as those above, can be used.

Finally, it is noted that because of the commutative group property of the fractional Fourier transform, the matrix/tensor representations, or in some realizations even the integrals cited above may be approximated by pre-computing one or more fixed step sizes and applying these respectively, iteratively, or in mixed succession to the image data.

One exemplary embodiment utilizing a pre-computation technique may be where the fractional Fourier transform represents pre-computed, positive and negative values of a small power, for example 0.01. Negative power deviations of increasing power can be had by iteratively applying the pre-computed −0.01 power fractional Fourier transform; for example, the power −0.05 would be realized by applying the pre-computed −0.01 power fractional Fourier transform five times. In some cases of adaptive system realizations, it may be advantageous to discard some of the resulting image data from previous power calculations. This may be accomplished by backing up to a slightly less negative power by applying the +0.01 power fractional Fourier transform to a last stored, resulting image.

As a second example of this pre-computation method, pre-computed fractional Fourier transform powers obtained from values of the series $2^{1/N}$ and $2^{-1/N}$ may be stored or otherwise made available, for example:

$$\{F^{\pm 1/1024}, F^{\pm 1/512}, F^{\pm 1/256}, F^{\pm 1/128}, F^{\pm 1/64}, \ldots\} \tag{19}$$

Then, for example, the power 11/1024 can be realized by operating on the image data with $$F^{1/1024}F^{1/512}F^{1/128} \tag{20}$$

where the pre-computed operators used are determined by the binary-decomposition of the power with respect to the smallest power value (here, the smallest value is 1/1024 and the binary decomposition of 11/1024 is 1/1024+1/512+1/128, following from the fact that 11=8+2+1). Such an approach allows, for example, N steps of resolution to be obtained from a maximum of $\log_2 N$ compositions of $\log_2 N$ pre-computed values.

It is noted that any of the aforementioned systems and methods may be adapted for use on portions of an image rather than the entire image. This permits corrections of localized optical aberrations. In complicated optical aberration situations, more than one portion of an image may be processed in this manner, with differing corrective operations made for each portion of the image.

Finally, it is noted that the systems and methods described herein may also be applied to conventional lens-based optical image processing systems, to systems with other types of elements obeying fractional Fourier optical models, as well as to widely ranging environments such as integrated optics, optical computing systems, particle beam systems, electron microscopes, radiation accelerators, and astronomical observation methods, among others.

Commercial products and services application are widespread. For example, the present invention may be incorporated into film processing machines, desktop photo editing software, photo editing web sites, VCRs, camcorders, desktop video editing systems, video surveillance systems, video conferencing systems, as well as in other types of products and service facilities. Four exemplary consumer-based applications are now considered.

1. One particular consumer-based application is in the correction of camera misfocus in chemical or digital photography. Here the invention may be used to process the image optically or digitally, or some combination thereof, to correct the misfocus effect and create an improved image which is then used to produce a new chemical photograph or digital image data file. In this application area, the invention can be incorporated into film processing machines, desktop photo editing software, photo editing web sites, and the like.

2. Another possible consumer-based application is the correction of video camcorder misfocus. Camcorder misfocus typically results from user error, design defects such as a poorly designed zoom lens, or because an autofocus function is autoranging on the wrong part of the scene being recorded. Non-varying misfocus can be corrected for each image with the same correction parameters. In the case of zoom lens misfocus, each frame or portion of the video may require differing correction parameters. In this application area, the invention can be incorporated into VCRs, camcorders, video editing systems, video processing machines, desktop video editing software, and video editing web sites, among others.

3. Another commercial application involves the correction of image misfocus experienced in remote video cameras utilizing digital signal processing. Particular examples include video conference cameras or security cameras. In these scenarios, the video camera focus cannot be adequately or accessibly adjusted, and the video signal may in fact be compressed.

4. Video compression may involve motion compensation operations that were performed on the unfocused video image. Typical applications utilizing video compression include, for example, video conferencing, video mail, and web-based video-on-demand, to name a few. In these particular types of applications, the invention may be employed at the video receiver, or at some pre-processing stage prior to delivering the signal to the video receiver. If the video compression introduces a limited number of artifacts, misfocus correction is accomplished as presented herein. However, if the video compression introduces a higher number of artifacts, the signal processing involved with the invention may greatly benefit from working closely with the video decompression signal processing. One particular implementation is where misfocus corrections are first applied to a full video frame image. Then, for some interval of time, misfocus correction is only applied to the changing regions of the video image. A specific example may be where large portions of a misfocused background can be corrected once, and then reused in those same regions in subsequent video frames.

5. The misfocus correction techniques described herein are directly applicable to electron microscopy systems and applications. For example, electron microscope optics employ the wave properties of electrons to create a coherent optics environment that obeys the Fourier optics structures as coherent light (see, for example, John C. H. Spence, *High-Resolution Electron Microscopy*, third edition, 2003, Chapters 2-4, pp. 15-88). Electron beams found in electron microscopes have the same geometric, optical physics characteristics generally found in coherent light, and the same mathematical quadratic phase structure as indicated in Levi [1] Section 19.2 for coherent light, which is the basis of the fractional Fourier transform in optical systems (see, for example, John C. H. Spence *High-Resolution Electron Microscopy*, third edition, 2003. Chapter 3, formula 3.9, pg. 55).

Misfocused Optical Path Phase Reconstruction

Most photographic and electronic image capture, storage, and production technologies are only designed to operate with image amplitude information, regardless as to whether the phase of the light is phase coherent (as is the case with lasers) or phase noncoherent (as generally found in most light sources). In sharply focused images involving noncoherent light formed by classical geometric optics, this lack of phase information is essentially of no consequence in many applications.

In representing the spatial distribution of light, the phase coefficient of the basis functions can be important; as an example, FIG. 3.6, p, 62 of *Digital Image Processing—Concepts, Algorithms, and Scientific Applications*, by Bernd Jahne, Springer-Verlag, New York, 1991 [20] shows the effect of loss and modification of basis function phase information and the resulting distortion in the image. Note in this case the phase information of the light in the original or reproduced image differs from the phase information applied to basis functions used for representing the image.

In using fractional powers of the Fourier transform to represent optical operations, the fractional Fourier transform reorganizes the spatial distribution of an image and the phase information as well. Here the basis functions serve to represent the spatial distribution of light in a physical system and the phase of the complex coefficients multiplying each of the basis functions mathematically result from the fractional Fourier transform operation. In the calculation that leads to the fractional Fourier transform representation of a lens, complex-valued coefficients arise from the explicit accounting for phase shifts of light that occurs as it travels through the optical lens (see Goodman [2], pages 77-96, and Levi [1], pages 779-784).

Thus, when correcting misfocused images using fractional powers of the Fourier transform, the need may arise for the reconstruction of relative phase information that was lost by photographic and electronic image capture, storage, and production technologies that only capture and process image amplitude information.

In general, reconstruction of lost phase information has not previously been accomplished with much success, but some embodiments of the invention leverage specific properties of both the fractional Fourier transform and an ideal correction condition. More specifically, what is provided—for each given value of the focus correction parameter—is the calculation of an associated reconstruction of the relative phase information. Typically, the associated reconstruction will be inaccurate unless the given value of the focus correction parameter is one that will indeed correct the focus of the original misfocused image.

This particular aspect of the invention provides for the calculation of an associated reconstruction of relative phase information by using the algebraic group property of the fractional Fourier transform to back calculate the lost relative phase conditions that would have existed, if that given specific focus correction setting resulted in a correctly focused image. For convergence of human or machine iterations towards an optimal or near optimal focus correction, the system may also leverage the continuity of variation of the phase reconstruction as the focus correction parameter is varied in the iterations.

Figure 10:
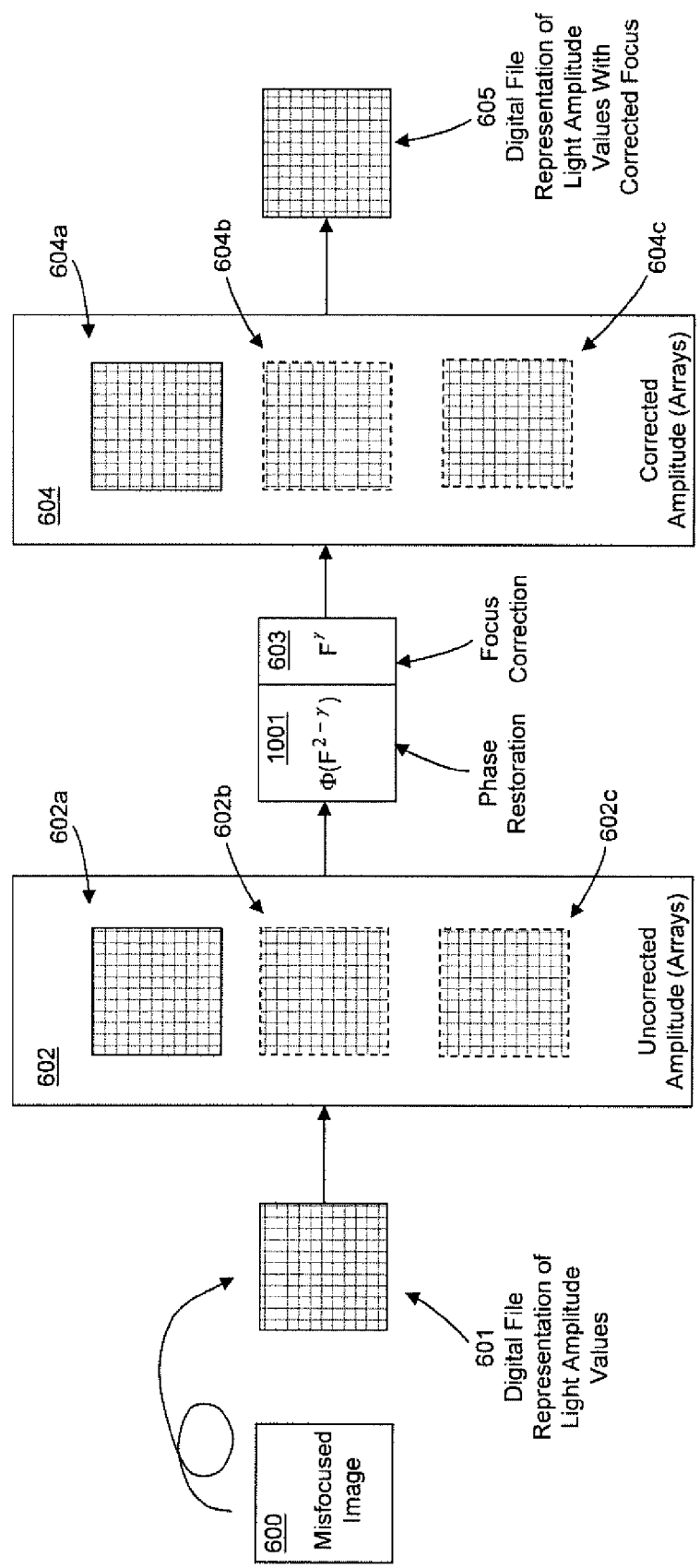
FIG. 10 is a block diagram showing an exemplary image misfocus correction process that also provides for phase correction, in accordance with an alternative embodiment of the invention.

To facilitate an understanding of the phase reconstruction aspect of the invention, it is helpful to briefly summarize the some of the image misfocus correction aspects of the invention. This summary will be made with reference to the various optical set-ups depicted in FIGS. 4-8, and is intended to provide observational details and examples of where and how the relative phase reconstruction may be calculated (FIG. 9) and applied (FIG. 10).

Misfocus Correction

Figure 4:
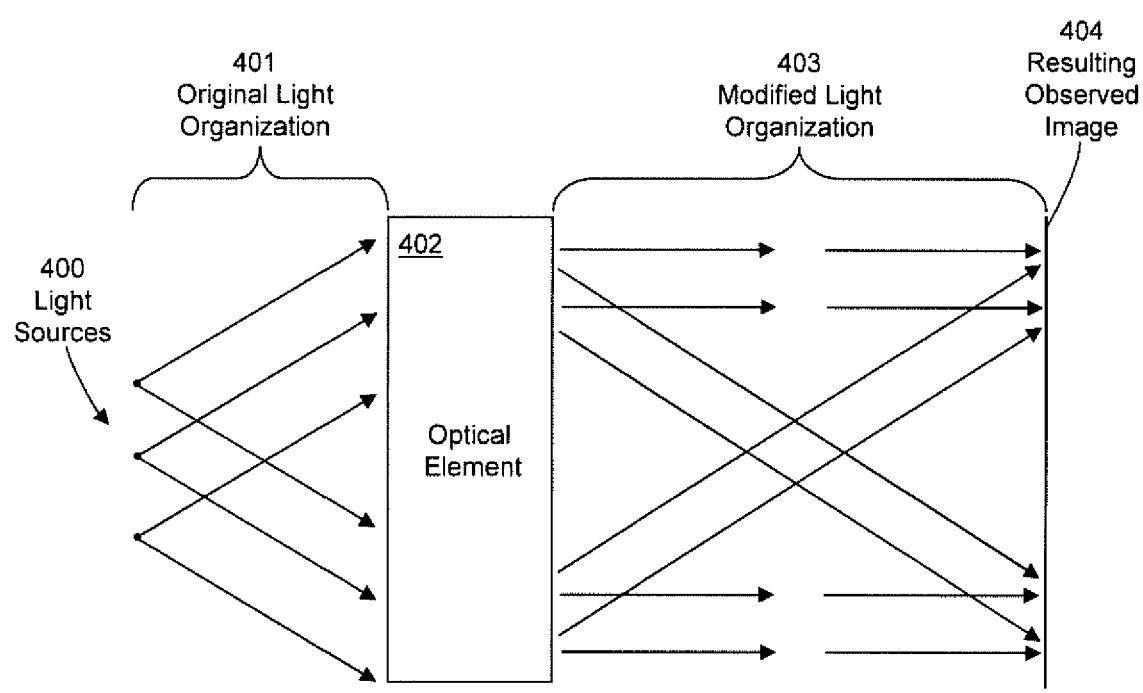
FIG. 4 is a diagram showing a generalized optical environment for implementing image correction in accordance with the present invention.

FIG. 4 shows a general optical environment involving sources of radiating light 400, a resulting original light organization (propagation direction, amplitude, and phase) 401 and its constituent photons. Optical element 402 is shown performing an image-forming optical operation, causing a modified light organization (propagation direction, amplitude, and phase) 403 and its constituent photons, ultimately resulting in observed image 404. This figure shows that for each light organization 401, 403 of light and photons, the propagation direction, amplitude, and phase may be determined by a variety of different factors. For example, for a given propagation media, propagation direction, amplitude, and phase may be determined by such things as the separation distance between point light source 400 and optical element 402, the pixel location in a transverse plane parallel to the direction of propagation, and light frequency/wavelength, among others.

Figure 5:
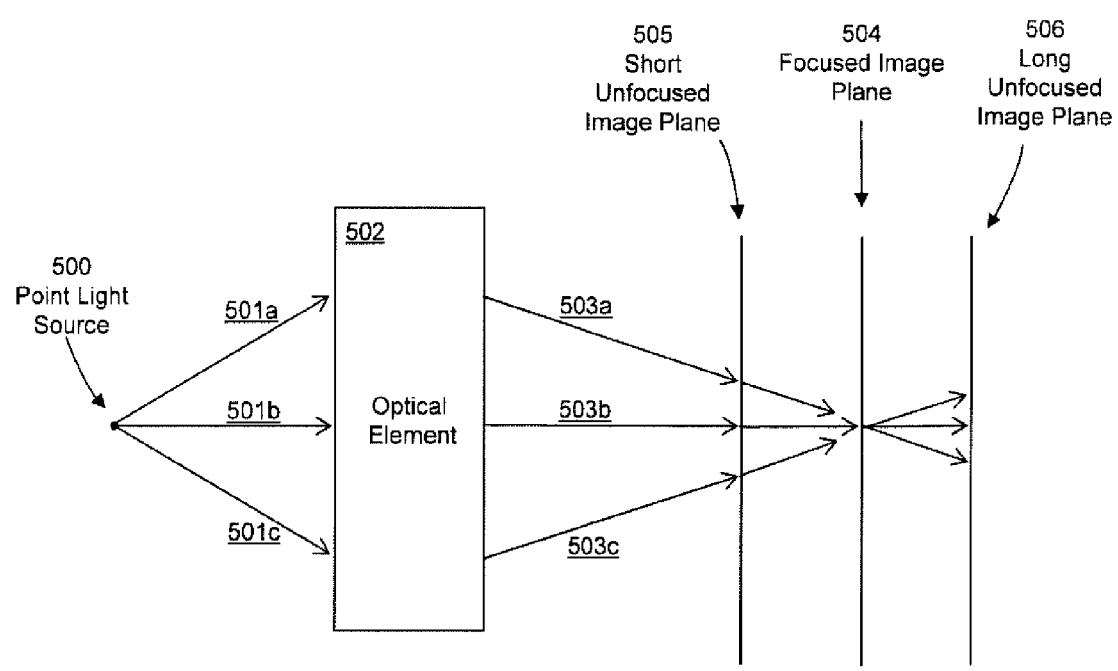
FIG. 5 is a diagram showing focused and unfocused image planes in relationship to the optical environment depicted in FIG. 4.

FIG. 5 is an optical environment similar to that depicted in FIG. 4, but the FIG. 5 environment includes only a single point light source 500. In this Figure, single point light source 500 includes exemplary propagation rays 501a, 501b, 501c that are presented to optical element 502. The optical element is shown imposing an optical operation on these rays, causing them to change direction 503a, 503b, 503c. Each of the rays 503a, 503b, 503c are shown spatially reconverging at a single point in the plane of image formation 504, which is a focused image plane.

FIG. 5 also shows directionally modified rays 503a, 503b, 503c spatially diverging at short unfocused image plane 505 and long unfocused image plane 506, which are each transverse to the direction of propagation that is associated with images which are not in sharp focus, which will be referred to as nonfocused image planes. Further description of the optical environment shown in FIG. 5 will be presented to expand on phase correction, and such description will be later discussed with regard to FIGS. 9-10.

Figure 6:
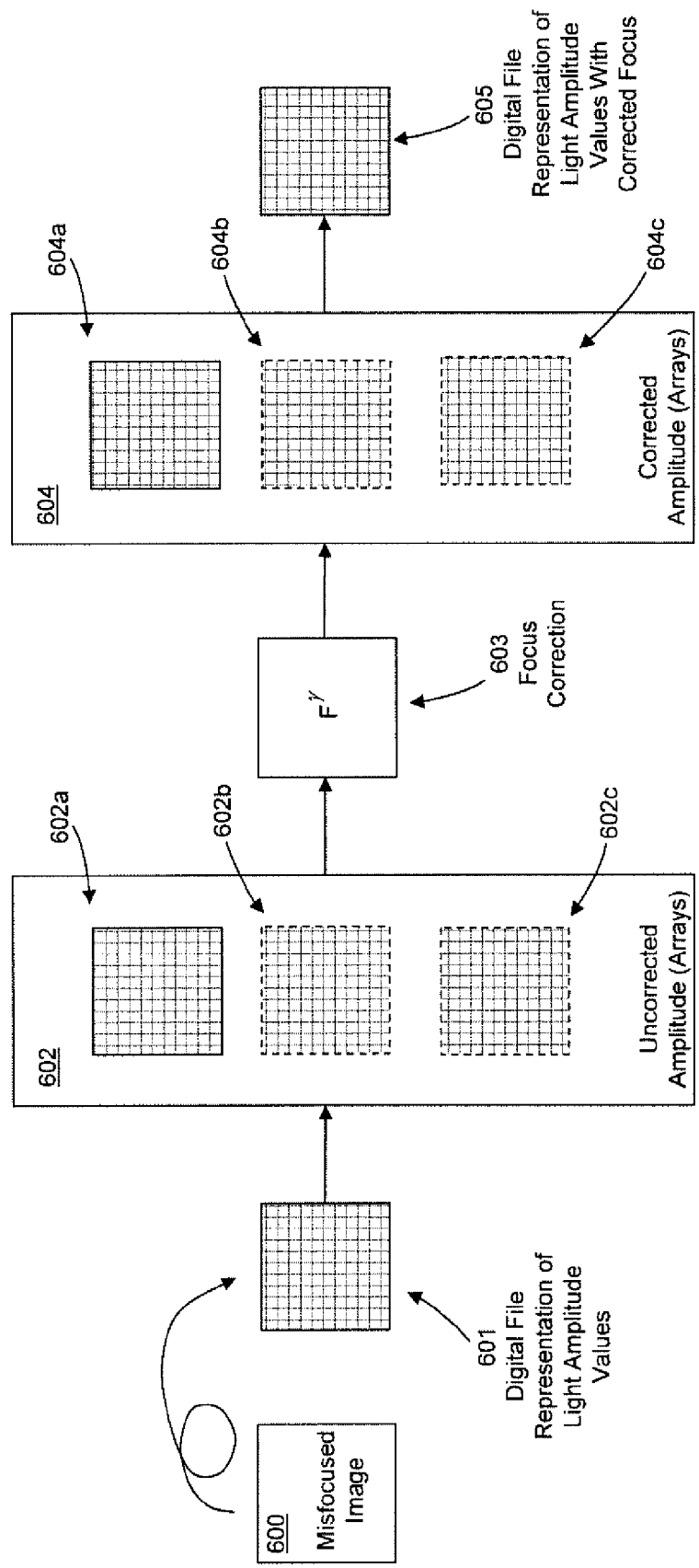
FIG. 6 is a block diagram showing an exemplary image misfocus correction process that also provides phase corrections.
Figure 7:
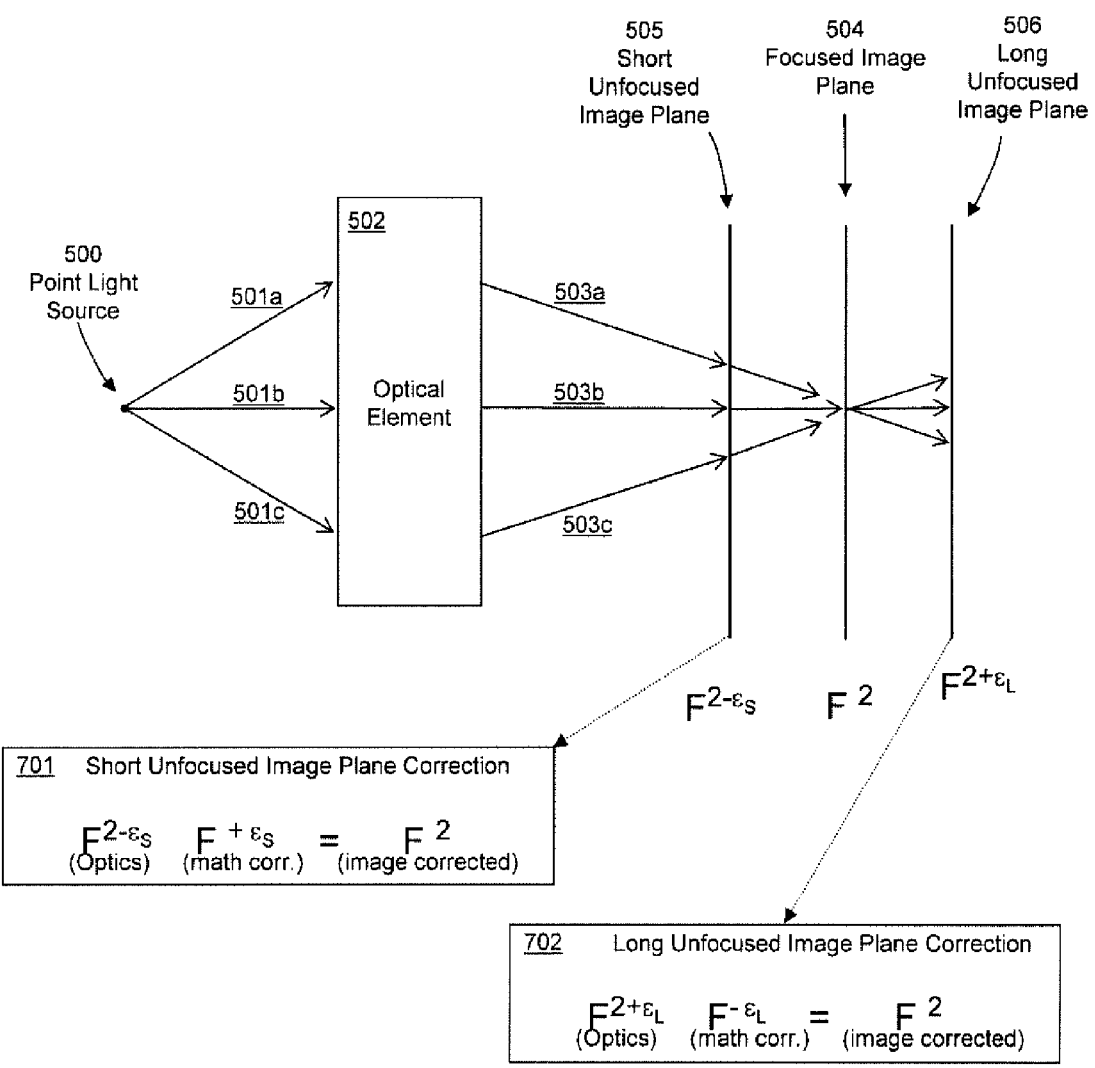
FIG. 7 is a diagram showing a more detailed view of the focused and unfocused image planes shown in FIG. 5.
Figure 8:
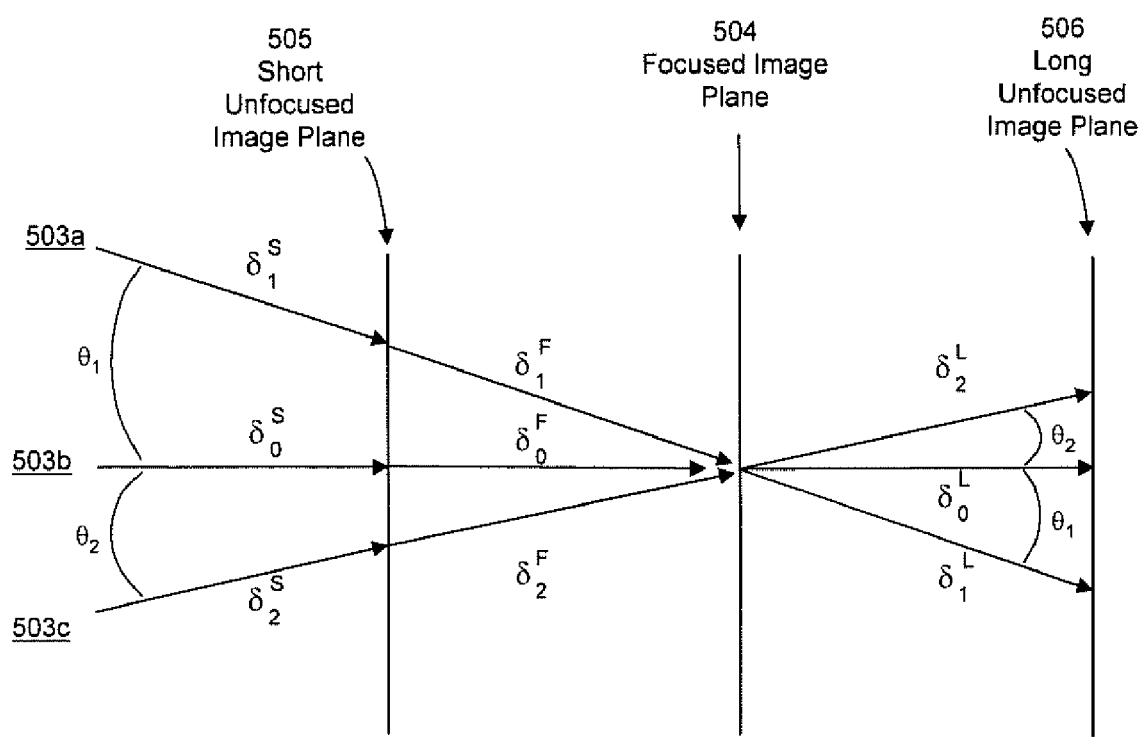
FIG. 8 is a diagram showing typical phase shifts involved in the focused and unfocused image planes depicted in FIG. 5.

Reference is now made to FIGS. 6-8, which disclose techniques for mathematical focus correction and provides a basis for understanding the phase correction aspect of the present invention. For clarity, the term "lens" will be used to refer to optical element 502, but the discussion applies equally to other types of optical elements such as a system of lenses, graded-index material, and the like.

FIG. 6 provides an example of image information flow in accordance with some embodiments of the present invention. As depicted in block 600, an original misfocused image is adapted or converted as may be necessary into a digital file representation of light amplitude values 601. Examples of original misfocused images include natural or photographic images. Digital file 601 may include compressed or uncompressed image formats.

For a monochrome image, the light amplitude values are typically represented as scalar quantities, while color images typically involve vector quantities such as RBG values, YUV values, and the like. In some instances, the digital file may have been subjected to file processes such as compression, decompression, color model transformations, or other data modification processes to be rendered in the form of an array of light amplitude values 602. Monochrome images typically only include a single array of scalar values 602a. In contrast, color images may require one, two, or more additional arrays, such as arrays 602b and 602c. A CMYB color model is a particular example of a multiple array, color image.

The array, or in some instances, arrays of light amplitude values 602 may then be operated on by a fractional power of the Fourier transform operation 603. This operation mathematically compensates for lens misfocus causing the focus problems in the original misfocused image 600. A result of this operation produces corrected array 604, and in case of a color model, exemplary subarrays 604a, 604b, 604c result from the separate application of the fractional power of the Fourier transform operation 603 to exemplary subarrays 602a, 602b, 602c. If desired, each of the corrected subarrays 604a, 604b, 604c may be converted into a digital file representation of the corrected image 605; this digital file could be the same format, similar format, or an entirely different format from that of uncorrected, original digital file representation 601.

FIG. 7 shows an optical environment having nonfocused planes. This figure shows that the power of the fractional Fourier transform operator increases as the separation distance between optical lens operation 502 and image planes 504, 505 increases, up to a distance matching that of the lens law. In accordance with some aspects of the invention, and as explained in Ludwig [5], Goodman [2], pages 77-96, and Levi [1], pages 779-784, an exactly focused image corresponds to a fractional Fourier transform power of exactly two. Furthermore, as previously described, misfocused image plane 505 lies short of the focused image plane 504, and corresponds to a fractional Fourier transform operation with a power slightly less than two. The deviation in the power of the fractional Fourier transform operation corresponding to short misfocus image plane 505 will be denoted $(-\epsilon_S)$, where the subscript "S" denotes "short." Since an exactly focused image at focused image plane 504 corresponds to a fractional Fourier transform power of exactly two, this short misfocus may be corrected by application of the fractional Fourier transform raised to the power $(+\epsilon_S)$, as indicated in block 701.

By mathematical extension, as described in [5], a long misfocused image plane 506 that lies at a distance further away from optical element 502 than does the focused image plane 504 would correspond to a fractional Fourier transform operation with a power slightly greater than two. The deviation in the power of the fractional Fourier transform operation corresponding to long misfocus image plane 506 will be denoted $(+\epsilon_L)$, where the subscript "L" denotes "long." This long misfocus may be corrected by application of the fractional Fourier transform raised to the power $(-\epsilon_L)$, as indicated in block 702.

Relative Phase Information in the Misfocused Optical Path

In terms of geometric optics, misfocus present in short misfocused image plane 505 and long misfocused image plane 506 generally correspond to non-convergence of rays traced from point light source 500, through optical element 502, resulting in misfocused images planes 505 and 506. For example, FIGS. 5 and 7 show exemplary rays 501*a*, 501*b*, 501*c* diverging from point light source 500, passing through optical element 502, and emerging as redirected rays 503*a*, 503*b*, 503*c*. The redirected rays are shown converging at a common point in focused image plane 504. However, it is important to note that these redirected rays converge at discreetly different points on misfocused image planes 505 and 506.

FIG. 8 is a more detailed view of image planes 504, 505 and 506. In this figure, rays 503*a*, 503*b*, 503*c* are shown relative to focused image plane 504, and misfocused image planes 505 and 506. This figure further shows the path length differences that lead to phase shifts of the focused and unfocused planes result from varying angles of incidence, denoted by $\theta_1$ and $\theta_2$. The distances of rays 503*a*, 503*b*, 503*c* from optical element 502 are given by the following table:

TABLE 1

| Ray | Distance to incidence with short misfocused plane 505 | Distance to incidence with focus plane 504 | Distance to incidence with long misfocused plane 506 |
|---|---|---|---|
| 503a | $\delta_1^S$ | $\delta_1^F$ | $\delta_1^L$ |
| 503b | $\delta_0^S$ | $\delta_0^F$ | $\delta_0^L$ |
| 503c | $\delta_2^S$ | $\delta_2^F$ | $\delta_2^L$ |

Simple geometry yields the following inequality relationships:

$$\delta_0^S < \delta_0^F < \delta_0^L \quad (21)$$

$$\delta_1^S < \delta_1^F < \delta_1^L \quad (22)$$

$$\delta_2^S < \delta_2^F < \delta_2^L \quad (23)$$

For a given wavelength $\lambda$, the phase shift $\psi$ created by a distance-of-travel variation $\delta$ is given by the following:

$$\psi = 2\pi\delta/\lambda \quad (24)$$

so the variation in separation distance between the focus image plane 504 and the misfocus image planes 505, 506 is seen to introduce phase shifts along each ray.

Further, for $\pi/2 > \theta_1 > \theta_2 > 0$, as is the case shown in FIG. 8, simple trigonometry gives:

$$\delta_0^F = \delta_1^F \sin\theta_1 \quad (25)$$

$$\delta_0^F = \delta_2^F \sin\theta_2 \quad (26)$$

$$1 > \sin\theta_1 > \sin\theta_2 > 0 \quad (27)$$

which in turn yields the inequality relationships:

$$\delta_0^S < \delta_2^S < \delta_1^S \quad (28)$$

$$\delta_0^F < \delta_2^F < \delta_1^F \quad (29)$$

$$\delta_0^L < \delta_2^L < \delta_1^L \quad (30)$$

Again, for a given wavelength $\lambda$, the phase shift $\psi$ created by a distance-of-travel variation $\delta$ is given by the following:

$$\psi = 2\pi\delta/\lambda \quad (31)$$

so the variation in separation distance between focused image plane 504 and the misfocused image planes 505, 506 is seen to introduce non-uniform phase shifts along each ray. Thus the misfocus of the original optical path involved in creating the original image (for example, 600 in FIG. 6) introduces a non-uniform phase shift across the rays of various incident angles, and this phase shift varies with the distance of separation between the positions of misfocused image planes 505, 506, and the focused image plane 504.

Referring again to FIGS. 6 and 7, an example of how a misfocused image 600 may be corrected will now be described. A misfocused image requiring correction will originate either from short misfocused plane 505 or long misfocused plane 506. In situations where misfocused image 600 originates from short misfocused plane 505, misfocus correction may be obtained by applying a fractional Fourier transform operation raised to the power $(+\epsilon_S)$, as indicated in block 701. On the other hand, in situations where misfocused image 600 originates from long misfocused plane 506, misfocus correction may be obtained by applying a fractional Fourier transform operation raised to the power $(-\epsilon_L)$, as indicated in block 702.

In general, the fractional Fourier transform operation creates results that are complex-valued. In the case of the discrete fractional Fourier transform operation, as used herein, this operation may be implemented as, or is equivalent to, a generalized, complex-valued array multiplication on the array image of light amplitudes (e.g., $\phi$). In the signal domain, complex-valued multiplication of a light amplitude array element, $\upsilon_{ij}$, by a complex-valued operator element $\phi$, results in an amplitude scaling corresponding to the polar or phasor amplitude of $\phi$, and a phase shift corresponding to the polar or phasor phase of $\phi$.

FIG. 9 shows a series of formulas that may be used in accordance with the present invention. As indicated in block 901, the fractional Fourier transform operation array (FrFT) is symbolically represented as the product of an amplitude information array component and a phase information array component. The remaining portions of FIG. 9 illustrate one technique for computing phase correction in conjunction with the correction of image misfocus. For example, block 902 shows one approach for correcting image misfocus, but this particular technique does not provide for phase correction. Image correction may proceed by first noting that the misfocused optics corresponds to a fractional Fourier transform of power $2-\epsilon$ for some unknown value of $\epsilon$; here $\epsilon$ may be positive (short-misfocus) or negative (long-misfocus). Next, the fractional Fourier transform may be mathematically applied with various, systematically selected trial powers until a suitable trial power is found. A particular example may be where the trial power is effectively equal to the unknown value of $\epsilon$. The resulting mathematically corrected image appears in focus and a corrected image is thus produced.

Referring still to FIG. 9, block 903 depicts the misfocus correction technique of block 901, as applied to the approach shown in block 902. This particular technique accounts for the amplitude and phase components of the optical and mathematical fractional Fourier transform operations. In particular, there is an amplitude and phase for the misfocused optics, which led to the original misfocused image 600.

As previously noted, conventional photographic and electronic image capture, storage, and production technologies typically only process or use image amplitude information, and were phase information is not required or desired. In these types of systems, the relative phase information created within the original misfocused optical path is lost since amplitude information is the only image information that is conveyed. This particular scenario is depicted in block 904, which shows original misfocused image 600 undergoing misfocus correction, even thought its relative phase information is not available. In all applicable cases relevant to the present invention (for example, $0<\epsilon<2$), the phase information is not uniformly zero phase, and thus the missing phase information gives an inaccurate result (that is, not equal to the focused case of the Fourier transform raised to the power 2) for what should have been the effective correction.

Relative Phase Restoration

In accordance with some embodiments, missing phase information may be reintroduced by absorbing it within the math correction stage, as shown block 905. This absorbing technique results in a phase-restored math correction of the form:

$$\Phi(F^{2-\gamma})F^{\gamma} \tag{32}$$

where the following symbolic notation is used:

$$\Phi(X) = \text{phase}(X) \tag{33}$$

In the case where $\gamma$ is close enough to be effectively equal to $\epsilon$, the phase correction will effectively be equal to the value necessary to restore the lost relative phase information. Note that this expression depends only on $\gamma$, and thus phase correction may be obtained by systematically iterating $\gamma$ towards the unknown value of $\epsilon$, which is associated with the misfocused image. Thus the iteration, computation, manual adjustment, and automatic optimization systems, methods, and strategies of non-phase applications of image misfocus correction may be applied in essentially the same fashion as the phase correcting applications of image misfocus correction by simply substituting $F^{\gamma}$ with $\Phi(F^{2-\gamma})F^{\gamma}$ in iterations or manual adjustments.

FIG. 10 provides an example of image information flow in accordance with some embodiments of the invention. This embodiment is similar to FIG. 6 is many respects, but the technique shown in FIG. 10 further includes phase restoration component 1001 coupled with focus correction component 603. In operation, image array 602 is passed to phase restoration component 1001, which pre-operates on image array 602. After the pre-operation calculation have been performed, fractional Fourier transform operation 603 is applied to the image array.

Numerical Calculation of Relative Phase Restoration

Next, the calculation of the phase-restored mathematical correction is considered. Leveraging two-group antislavery properties of the fractional Fourier transform operation, the additional computation can be made relatively small.

In the original eigenfunction/eigenvector series definitions for both the continuous and discrete forms of the fractional Fourier transform of power $\alpha$, the nth eigenfunction/eigenvectors are multiplied by:

$$e^{-in\pi\alpha/2} \tag{34}$$

Using this equation and replacing $\alpha$ with $(2-\gamma)$ gives:

$$e^{-in\pi(2-\gamma)/2} = e^{-in\pi}e^{-in\pi(-\gamma)/2} \tag{35}$$
$$= (-1)^n e^{-in\pi(-\gamma)/2}$$

for both the continuous and discrete forms of the fractional Fourier transform. Note that the following equation:

$$e^{-in\pi(-\gamma)} \tag{36}$$

can be rewritten as:

$$e^{-in\pi(-\gamma)} = e^{in\pi\gamma} = (e^{-in\pi\gamma})^* \tag{37}$$

where $(X)^*$ denotes the complex conjugate of X.

Also, because the nth Hermite function $h_n(y)$ is odd in y for odd n, and even in y for even n, such that:

$$h_n(-y) = (-1)^n h_n(-y) \tag{38}$$

so that in the series definition the nth term behaves as:

$$h_n(x)h_n(y)e^{-in\pi(2-\gamma)/2} = h_n(x)h_n(y)(-1)^n e^{-in\pi(-\gamma)/2} \tag{39}$$
$$= h_n(x)h_n(-y)e^{-in\pi(-\gamma)/2}$$
$$= h_n(x)h_n(-y)(e^{-in\pi\gamma})^*$$

For both the continuous and discrete forms of the fractional Fourier transform, replacing $h_n(y)$ with $h_n(-y)$ is equivalent to reversing, or taking the mirror image, of $h_n(y)$. In particular, for the discrete form of the fractional Fourier transform, this amounts to reversing the order of terms in the eigenvectors coming out of the similarity transformation, and because of the even-symmetry/odd-antisymmetry of the Hermite functions and the fractional Fourier transform discrete eigenvectors, this need only be done for the odd number eigenvectors.

Further, since the Hermite functions and discrete Fourier transform eigenvectors are real-valued, the complex conjugate can be taken on the entire term, not just the exponential, as shown by:

$$h_n(x)h_n(-y)(e^{-in\pi\gamma})^* = [h_n(x)h_n(-y)e^{in\pi\gamma}]^* \tag{40}$$

Since complex conjugation commutes with addition, all these series terms can be calculated and summed completely before complex conjugation, and then one complex conjugation can be applied to the sum, resulting in the same outcome.

The relative phase-restored mathematical correction can thus be calculated directly, for example, by the following exemplary algorithm or its mathematical or logistic equivalents:

1. For a given value of $\gamma$, compute $F^{\gamma}$ using the Fourier transform eigenvectors in an ordered similarity transformation matrix;
2. For the odd-indexed eigenvectors, either reverse the order or the sign of its terms to get a modified similarity transformation;

3. Compute the complete resulting matrix calculations as would be done to obtain a fractional Fourier transform, but using this modified similarity transformation;
4. Calculate the complex conjugate of the result of operation (3) to get the phase restoration, $(\Phi(F^\gamma))^*$; and
5. Calculate the array product of the operation (1) and operation (4) to form the phase-restored focus correction $(\Phi(F^\gamma))^*F^\gamma$.

As an example of a mathematical or logistic equivalent to the just described series of operations, note the commonality of the calculations in operations (1) and (3), differing only in how the odd-indexed eigenvectors are handled in the calculation, and in one version, only by a sign change. An example of a mathematical or logistic equivalent to the above exemplary technique would be:

1. For a given value of $\gamma$, partially compute $F^\gamma$ using only the even-indexed Fourier transform eigenvectors;
2. Next, partially compute the remainder of $F^\gamma$ using only the odd-indexed Fourier transform eigenvectors;
3. Add the results of operation (1) and (2) to get $F^\gamma$
4. Subtract the result of operation (2) from the result of operation (1) to obtain a portion of the phase restoration;
5. Calculate the complex conjugate of the result of operation (4) to obtain the phase restoration $(\Phi(F^\gamma))^*$; and
6. Calculate the array product of operations (1) and (4) to form $(\Phi(F^\gamma))^*F^\gamma$.

In many situations, partially computing two parts of one similarity transformation, as described in the second exemplary algorithm, could be far more efficient than performing two full similarity transformation calculations, as described in the first exemplary algorithm. One skilled in the art will recognize many possible variations with differing advantages, and that these advantages may also vary with differing computational architectures and processor languages.

Embedding Phase Restoration within Image Misfocus Correction

Where relative phase-restoration is required or desired in mathematical focus correction using the fractional Fourier transform, phase restoration element 1001 may be used in combination with focus correction element 603, as depicted in FIG. 10.

It is to be realized that in image misfocus correction applications which do not account for phase restoration, pre-computed values of $F^\gamma$ may be stored, fetched, and multiplied as needed or desired. Similarly, in image misfocus correction applications which provide for phase restoration, pre-computed values of $\Phi(F^\gamma))^*F^\gamma$ may also be stored, fetched, and multiplied as needed or desired. For example, pre-computed values of phase reconstructions may be stored corresponding to powers of the fractional Fourier transform, such that the powers are related by roots of the number 2, or realized in correspondence to binary representations of fractions, or both. In these compositions, care may need to be taken since the array multiplications may not freely commute due to the nonlinear phase extraction steps.

Each of the various techniques for computing the phase-restored focus correction may include differing methods for implementing pre-computed phase-restorations. For example, in comparing the first and second exemplary algorithms, predominated values may be made and stored for any of:

First example algorithm operation (5) or its equivalent second example algorithm operation (6);
First example algorithm operation (4) or its equivalent second example algorithm operation (5); and
Second example algorithm operations (1) and (2) with additional completing computations provided as needed.

Again, it is noted that these phase restoration techniques can apply to any situation involving fractional Fourier transform optics, including electron microscopy processes and the global or localized correction of misfocus from electron microscopy images lacking phase information. Localized phase-restored misfocus correction using the techniques disclosed herein may be particularly useful in three-dimensional, electron microscopy and tomography where a wide field is involved in at least one dimension of imaging.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

REFERENCES CITED

The following references are cited herein:

[1] L. Levi, *Applied Optics*, Volume 2 (Section 19.2), Wiley, New York, 1980;
[2] J. W. Goodman, *Introduction to Fourier Optics*, McGraw-Hill, New York, 1968;
[3] K. Iizuka, *Engineering Optics*, Second Edition, Springer-Verlag, 1987;
[4] A. Papoulis, *Systems and Transforms with Applications in Optics*, Krieger, Malabar, Fla., 1986;
[5] L. F. Ludwig, "General Thin-Lens Action on Spatial Intensity (Amplitude) Distribution Behaves as Non-Integer Powers of Fourier Transform," *Spatial Light Modulators and Applications Conference*, South Lake Tahoe, 1988;
[6] R. Dorsch, "Fractional Fourier Transformer of Variable Order Based on a Modular Lens System," in *Applied Optics*, vol. 34, no. 26, pp. 6016-6020, September 1995;
[7] E. U. Condon, "Immersion of the Fourier Transform in a Continuous Group of Functional Transforms," in *Proceedings of the National Academy of Science*, vol. 23, pp. 158-161, 1937;
[8] V. Bargmann, "*On a Hilbert Space of Analytical Functions and an Associated Integral Transform*," Comm. Pure Appl. Math, Volume 14, 1961, 187-214;
[9] V. Namias, "The Fractional Order Fourier Transform and its Application to Quantum Mechanics," in *J. of Institute of Mathematics and Applications*, vol. 25, pp. 241-265, 1980;
[10] B. W. Dickinson and D. Steiglitz, "Eigenvectors and Functions of the Discrete Fourier Transform," in *IEEE Transactions on Acoustics, Speech, and Signal Processing*, vol. ASSP-30, no. 1, February 1982;
[11] F. H. Kerr, "A Distributional Approach to Namias' Fractional Fourier Transforms," in *Proceedings of the Royal Society of Edinburgh*, vol. 108A, pp. 133-143, 1983;
[12] F. H. Kerr, "On Namias' Fractional Fourier Transforms," in *IMA J. of Applied Mathematics*, vol. 39, no. 2, pp. 159-175, 1987;
[13] P J. Davis, *Interpolation and Approximation*, Dover, N.Y., 1975;
[14] N. I. Achieser, *Theory of Approximation*, Dover, N.Y., 1992;
[15] G. B. Folland, *Harmonic Analysis in Phase Space*, Princeton University Press, Princeton, N.J., 1989;

[16] N. N. Lebedev, *Special Functions and their Applications*, Dover, N.Y., 1965;

[17] N. Wiener, *The Fourier Integral and Certain of Its Applications*, (Dover Publications, Inc., New York, 1958) originally Cambridge University Press, Cambridge, England, 1933;

[18] S. Thangavelu, *Lectures on Hermite and Laguerre Expansions*, Princeton University Press, Princeton, N.J., 1993;

[19] "Taking the Fuzz out of Photos," *Newsweek*, Volume CXV, Number 2, Jan. 8, 1990; and

[20] Jahne, Bernd, *Digital Image Processing—Concepts, Algorithms, and Scientific Applications*, Springer-Verlag, New York, 1991.

What is claimed is:

1. A computer-implemented method for correcting misfocus in original particle beam image data, the method comprising:

assigning a correction parameter value to a fractional power parameter associated with a fractional Fourier transform operation ("FFTO") to produce a resulting approximated FFTO;

operating on the original particle beam image data with the approximated FFTO to produce transformed image data;

determining a degree of improvement in the focus of the transformed image data over that of the original particle beam image data;

storing the original particle beam image data as a digital image; and restoring phase information associated with the original particle beam image data;

wherein the particle beam is an electron beam associated with an electron microscope.

2. The method of claim 1, further comprising adjusting the correction parameter value, and operating on the original particle beam image data with another resulting approximated FFTO having determined by the adjusted correction parameter value.

3. The method of claim 2, further comprising: adjusting the correction parameter in response to a user input.

4. The method of claim 2, further comprising: adjusting the correction parameter in response to a control system.

5. The method of claim 1, wherein the FFTO is a numerical algorithm.

6. The method of claim 1, wherein the fractional Fourier transform operation is approximated by any from the group of a Taylor series expansion, a Hermite function expansion, a perturbation approximation, a singular integral approximation, or an infinitesimal generator.

7. The method of claim 1, wherein the original image data represents data from a first portion of an image, the method further comprising:

correcting misfocus for other image data representing data from a second portion of the image.

8. A system for correcting misfocus in original particle beam image data, said system comprising:

a fractional Fourier transform component for applying at least one fractional Fourier transform operation ("FFTO") on the original particle beam image data, wherein at least a portion of the original particle beam image data is misfocused in at least one region of interest;

a parameter adjuster configured with said fractional Fourier transform component, said parameter adjuster providing a range of variation of at least one parameter of the at least one fractional Fourier transform operation to improve a corresponding range of misfocus in said original particle beam image data;

wherein the original particle beam image data is introduced to said fractional Fourier transform component and the at least one fractional Fourier transform operation is applied to the original particle beam image data, resulting in improved particle beam image data that improves the focus of at least a portion of said misfocus in the original particle beam image data, and wherein said fractional Fourier transform component is realized by a numerical algorithm, wherein the numerical algorithm realizing the fractional Fourier transform component comprises an approximation.

9. The system of claim 8, further comprising:

a phase reconstructing element to reconstruct phase information pertaining to the original particle beam image data as part of the correction of the misfocus.

10. The system of claim 8, further comprising:

memory to store the original particle beam image data as a digital image.

11. The system of claim 8, wherein the parameter adjuster is controlled by user input.

12. The system of claim 8, wherein the parameter adjuster is controlled by an optimization algorithm.

13. The system of claim 8, wherein the approximation employs any from the group of a Taylor series expansion, a Hermite function expansion, a perturbation approximation, a singular integral approximation, or an infinitesimal generator.

14. The system of claim 8, wherein the original image data represents data from a first portion of an image, the method further comprising:

correcting misfocus for other image data representing data from a second portion of the image.

15. The method of claim 8, wherein the particle beam is an electron beam associated with an electron microscope.

* * * * *

UNITED STATES PATENT AND TRADEMARK OFFICE
CERTIFICATE OF CORRECTION

PATENT NO. : 7,697,777 B2
APPLICATION NO. : 11/929360
DATED : April 13, 2010
INVENTOR(S) : Lester F. Ludwig It is certified that error appears in the above-identified patent and that said Letters Patent is hereby corrected as shown below:

Title Pg, Item (54) Title and Col. 1, Lines 1-4 should read as follows:

-- FOCUS CORRECTION IN ELECTRON MICROSCOPE AND PARTICLE BEAM IMAGING SYSTEMS --.

Title Pg, Item (57) Abstract: Please replace the ABSTRACT with the following new ABSTRACT:

ABSTRACT

-- A computer-implemented system and method for correcting misfocus in original particle beam image data by using a fractional Fourier transform operation or an approximation of it. In one embodiment, the particle beam image data is produced by an electron microscope. The approximation of a fractional Fourier transform operation may comprise a portion of a Taylor series expansion, a Hermite function expansion, a perturbation approximation, a singular integral approximation, or an infinitesimal generator. The described embodiments provide for the reconstruction of phase information associated with the original image data, and for the reconstructed phase information to also utilize an approximation of a fractional Fourier transform operation. The focus correction can be selected and controlled by user interaction or an automatic feedback control system that may include optimization. --.

Signed and Sealed this

Eighteenth Day of May, 2010

David J. Kappos
*Director of the United States Patent and Trademark Office*